Figure 1:
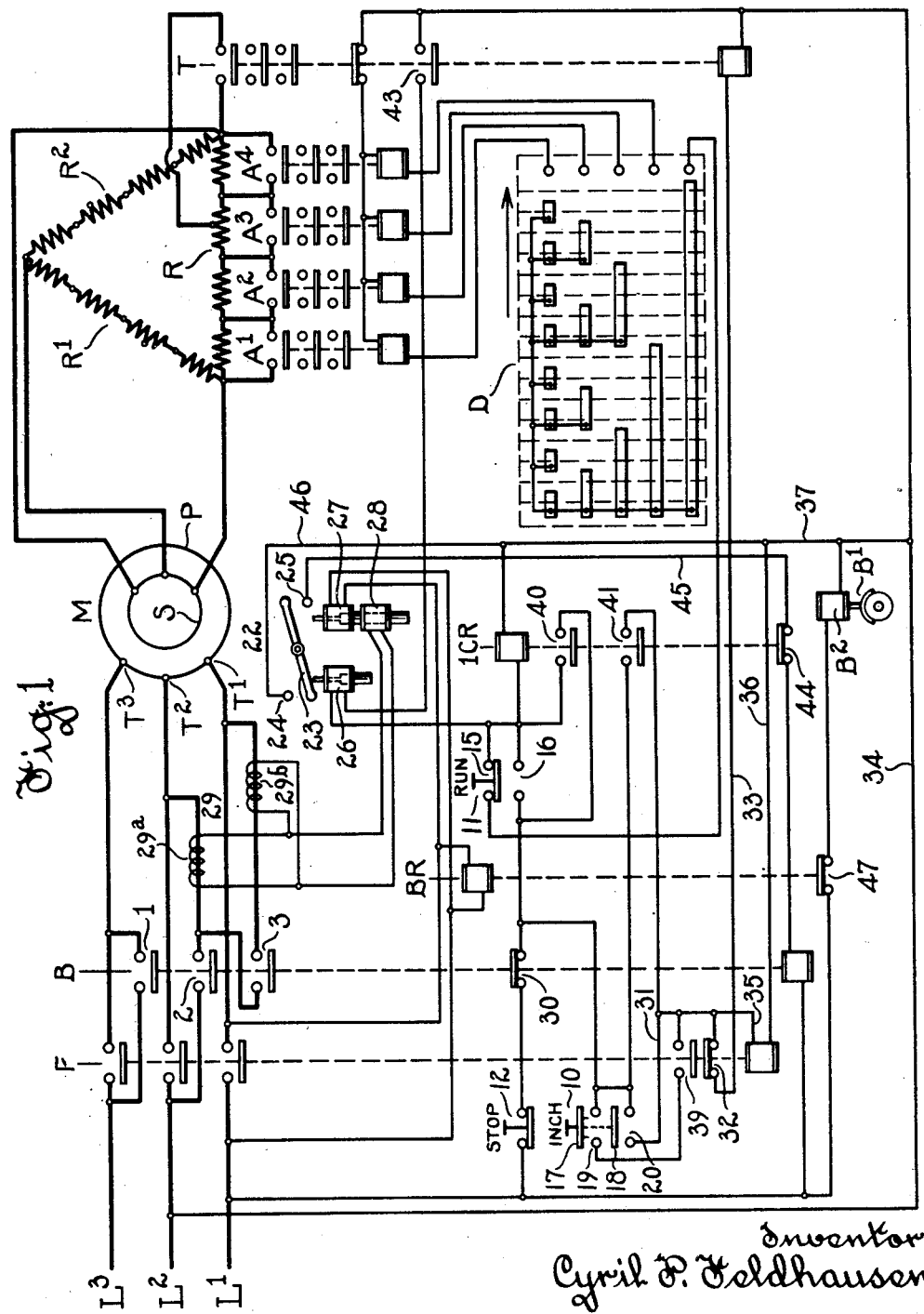

Nov. 29, 1949     C. P. FELDHAUSEN     2,489,876
CONTROLLER FOR STOPPING MOTOR-DRIVEN MACHINES
Filed June 26, 1947     2 Sheets-Sheet 1

Inventor
Cyril P. Feldhausen
By Fred N Hubbard
Attorney

Nov. 29, 1949 — C. P. FELDHAUSEN — 2,489,876

CONTROLLER FOR STOPPING MOTOR-DRIVEN MACHINES

Filed June 26, 1947

Inventor
Cyril P. Feldhausen
By Frank W. Hubbard
Attorney

Patented Nov. 29, 1949

2,489,876

UNITED STATES PATENT OFFICE 2,489,876

CONTROLLER FOR STOPPING MOTOR-DRIVEN MACHINES

Cyril P. Feldhausen, Wauwatosa, Wis., assignor to Cutler-Hammer, Inc., Milwaukee, Wis., a corporation of Delaware Application June 26, 1947, Serial No. 757,142

9 Claims. (Cl. 318—367)

This invention relates to controllers for stopping motor driven machines, controllers embodying the invention being especially advantageous for rotogravure presses.

Such presses are commonly equipped with ink removing knives rendering it important to insure against even a few degrees of reverse movement of the press in stopping. This necessitates terminating mechanical braking prior to bringing the press to zero speed because if this is not done some degree of backup of the press is likely to occur. Self-braking of the motor supplemented by mechanical braking is highly desirable and heretofore plugging supplemented by mechanical braking has been employed with some success, dropping of the plugging relay having been utilized to energize the brake solenoid for release of the mechanical brake. However, such control has the characteristic of effecting reverse operation unless the plugging relay always drops out prior to attainment of zero speed and escape from the risk of reversal through use of this type of control is desirable in the case of rotogravure presses equipped with such ink removing knives.

The motors commonly employed for such rotogravure presses are of the alternating current slip ring type, and it is an object of the present invention to provide for self-braking of such motors without resort to plugging, thereby avoid risk of power reversal of the motor and further to provide means in conjunction with the electrical braking means to effect mechanical braking until the press closely approaches zero speed, and then to function with reliability to effect release of the mechanical brake.

Various other objects and advantages of the invention will hereinafter appear.

The accompanying drawings illustrate certain embodiments of the invention which will now be described, it being understood that the embodiments illustrated are susceptible of modification without departing from the scope of the appended claims.

Figure 2:
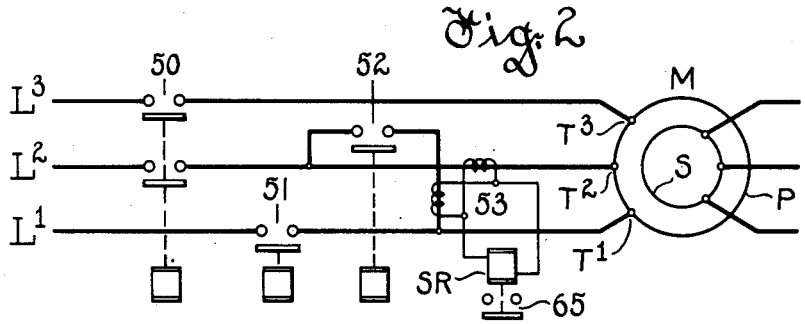
Figure 3:
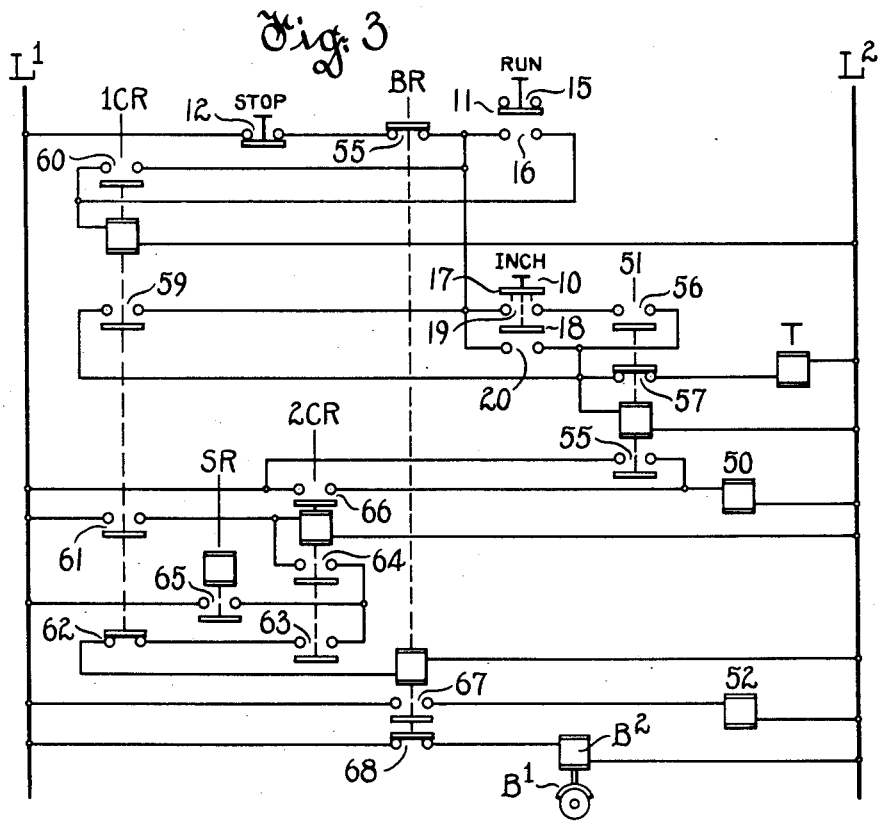

In the drawing,

Figure 1 shows schematically and diagrammatically a preferred embodiment of the invention, and Figs. 2 and 3 illustrate diagrammatically certain of the possible modifications of the control of Fig. 1.

Referring to Fig. 1, the same shows a three phase alternating current slip ring motor M having a primary P and a secondary S.

The motor secondary has the usual delta connected resistors R, $R^1$ and $R^2$ to be excluded from circuit in steps by triple pole electromagnetic switches $A^1$, $A^2$, $A^3$ and $A^4$ in the usual manner for speed control. Also the resistors are under the control of a triple pole electroresponsive switch T to provide increased torque of the motor in starting. For simplicity of illustration the showing of connections between the resistors and their control switches aforementioned has been confined to the connections for resistor R, it being understood that resistors $R^1$ and $R^2$ have similar connections to said control switches.

The primary P of the motor is adapted to be supplied from lines $L^1$, $L^2$ and $L^3$ through a triple pole electromagnetic switch F for power operation, whereas the motor primary is adapted to be connected to lines $L^2$ and $L^3$ for dynamic braking. The connections for power operation which are established by the switch F are so well known and are so simple as to render description unnecessary. The switch B through its contacts 1 connects motor terminal $T^3$ to line $L^3$ and through its contacts 2 connects motor terminal $T^2$ to line $L^2$, whereas through its contacts 3 it connects motor terminal $T^1$ to motor terminal $T^2$. Thus provision is made for dynamic braking of motor M in a well known manner for stopping of the motor. In practice the switches F and B are preferably mechanically interlocked in one of the well known ways to prevent closure of both at the same time which would provide a short-circuit across lines $L^1$ and $L^2$. However, the mechanical interlock has been omitted for simplicity of illustration.

For mechanical braking of the motor there is shown a brake $B^1$ having an electromagnetic winding $B^2$ to effect its release for free rotation of the motor, as is customary.

The controller shown for the aforementioned switches and brake releasing winding is largely of well known form comprising an inch push button switch 10, a run push button switch 11, a stop push button switch 12, a brake relay BR, a relay 1CR and the usual drum type controller D for selection of the switches $A^1$ to $A^4$ to be energized for speed regulation. The stop push button switch 12 comprises a single set of contacts and is of the normally closed type. The push button switch 11 is of the double throw type having normally bridged up contacts 15 and normally unbridged down contacts 16. The inch push button switch which is of well known type comprises two movable contacts 17 and 18 respectively to bridge stationary contacts 19 and 20. It is ineffective until pushed to bridge contacts 20, whereas it remains effective to continue inching after releasing contact 18 from contacts 20 so long as contact 17 bridges contacts 19.

Further the control means illustrated comprises a relay 22 having a double ended pivoted contact arm 23 which in one position bridges contacts 24 and 25 and which in another position disengages said contacts. The arm 23 is designed to inherently retain either of such positions, and an electromagnet 26 when energized momentarily is adapted through the medium of its plunger to move arm 23 into bridging engagement with contacts 24 and 25. A second electromagnet 27 when energized and when unopposed is adapted through the medium of its plunger to rock the arm 23 out of engagement with contacts 24 and 25. Such action of electromagnet 27 is opposed by an electromagnet 28 which when energized to a predetermined degree effectively restrains the electromagnet 27 against action. The electromagnet 26 is under the control of the run push button switch 11, while the electromagnet 27 is under the control of electroresponsive switch B, the restraining electromagnet 28 being under the control of a differential current transformer 29. The transformer 29 comprises windings $29^a$ and $29^b$ in which are induced currents by the currents in different branches of the dynamic braking connections established by switch B. This transformer is similar to that shown in the patent of E. Pell, No. 2,417,012, March 4, 1947, and functions during braking to maintain the electromagnet 28 effective to prevent opening of relay 22 until the motor M closely approaches zero speed.

Further describing the controller of Fig. 1 and its functions, the various switches including relay 22 occupy the positions illustrated when motor M is at rest. Inching may be effected through the medium of the push button switch 10 which when depressed energizes switches T and F to effect high torque starting of the motor, the motor being stopped upon release of push button switch 10. Normally the brake releasing winding $B^2$ is energized and it remains energized throughout inching. Also the relay 22 remains idle during inching, there being no braking for stopping after inching.

More particularly, depression of the inch push button switch 10 completes a circuit from line $L^1$ through stop switch 12, normally closed contacts 30 of braking switch B, and contacts 20 of switch 10, by conductor 31 to and through normally engaged contacts 32 of switch F, by conductor 33 through the winding of switch T, by conductor 34 to line $L^2$. Also circuit is completed from conductor 31 by conductor 35 through the winding of switch F by conductors 36 and 37 to conductor 34, and thence to line $L^2$. This provides for response of switches T and F for high torque starting, the contacts 32 of switch F having a time element in opening sufficient to permit starting of the motor. Such time element may be afforded in any of the well known ways and when contacts 32 disengage switch T is dropped out for inclusion of all secondary resistance during continued energization of switch F by push button switch 10. As soon as switch F responds its contact 39 engage to shunt the contacts 18 and 20 of push button switch 10 through the contacts 17 and 19 of switch 10. This inching control is in accordance with well known practice.

When the run button 11 is depressed it establishes an energizing circuit for relay 1CR which in responding establishes a maintaining circuit for itself. Also this relay in responding energizes the switches T and F for starting the motor with relatively high torque and then including all of the secondary resistance through deenergization of switch T. Then upon release of push button switch 11 the 1CR relay maintains switch F energized and said switch 11 establishes a feed connection to the drum D to energize such of the switches $A^1$ to $A^4$ as are selected by the drum for energization. As heretofore explained the winding $B^2$ of the mechanical brake is normally energized for release of the brake and the brake remains released pending stopping.

Relay 1CR in addition to effecting establishment of running connections as aforedescribed also establishes energizing connections for the electromagnet 26 of relay 22, causing the arm 23 of said relay to move into engagement with contacts 24 and 25. This operation of the relay 22 has no immediate results but prepares for stopping action of the controller.

More specifically operation of the run push button switch 11 connects the winding of relay 1CR to line $L^1$ through the normally closed contacts 30 of switch B and stop push button switch 12, whereas said winding is connected to line $L^2$ by conductors 37 and 34. Relay 1CR upon responding engages its contacts 40 to parallel contacts 16 of push button switch 11 and engages its contacts 41 to establish a circuit paralleling the contacts 20 of inch switch 10, thereby energizing switches T and F as described in detail hereinbefore. Also relay 1CR completes circuit from line $L^1$ through its contacts 40 to and through the electromagnet 26 of relay 22 to and through contacts 43 of switch T, by conductor 34 to line $L^2$, opening of switch T thus effecting deenergization of electromagnet 26. The momentary energization of electromagnet 26 of relay 22 moves the arm 23 with a resulting tendency to energize the operating winding of brake switch B, but meanwhile relay 1CR disengages its contacts 44 to defeat such tendency. The energizing circuit of the winding of braking switch B may be traced from line $L^1$ through said winding and through contacts 44 of relay 1CR by conductor 45, to and through the arm 23 of relay 22 by conductors 46 and 37 to conductor 34, and thence to line $L^2$.

Stopping of the motor is effected by depressing the push button switch 12 which deenergizes the switch F to interrupt running connections and which also deenergizes relay 1CR. Relay 1CR in releasing engages its contacts 44 to complete the previously traced energizing circuit of the winding of switch B. Switch B thus responds, disengaging its contacts 30 to render ineffective reclosure of stop switch 12, and engages its main contacts 1, 2 and 3 to establish dynamic braking connections for motor M. Moreover contacts 3 of switch B connect the winding of brake relay BR across lines $L^1$, $L^2$, said winding being connected across the contacts of one pole of switch F. Thus upon response of switch B the brake relay BR is energized to disengage its contacts 47 which are in circuit with the normally energized winding of mechanical brake $B^1$. This renders the mechanical brake effective to supplement the electrical braking.

Upon establishment of braking connections the differential current transformer 29 effects energization of the restraining electromagnet 28 of relay 22, energizing said electromagnet sufficiently to prevent action of the electromagnet 27, which as will be apparent is in parallel with the winding of brake relay BR for energization upon response of braking switch B. Dynamic braking and mechanical braking will continue until the current supplied to the electromagnet 28 by the differential current transformer drops to a predetermined value, the transformer being so designed that this will occur when and only when the motor closely approaches zero speed. When such reduction does occur the electromagnet 27 responds to open relay 22, with the result of deenergizing braking switch B, which in turn deenergizes brake relay BR along with the electromagnet 27 of relay 22. Brake relay BR thus re-engages its contacts 47 to energize the releasing winding $B^2$ of the mechanical brake substantially simultaneously with interruption of dynamic braking connections by deenergization of braking switch B. Thus the motor and the press or other machine driven thereby may come to rest without danger of power reversal or of backup as the result of mechanically braking to a standstill.

Referring to the modified controller of Figs. 2 and 3, it differs from that shown in Fig. 1 mainly in the means for controlling termination of braking and the means for controlling the primary connections of the motor.

Referring to Fig. 2, the motor primary connections are in this instance controlled by a two-pole electromagnetic switch 50 and two single pole electromagnetic switches 51 and 52. The switches 50 and 51 jointly control power connections for running, whereas the switches 50 and 52 jointly control dynamic braking connections, such power and dynamic braking connections being the same as in Fig. 1. The dynamic braking connections as in Fig. 1 have associated therewith a differential current transformer 53, but the transformer is employed in connection with a series relay SR in lieu of the relay 22 of Fig. 1. The motor in this instance is the same as in Fig. 1, and while for simplicity of illustration the control for the secondary circuit is not shown it may be assumed that such control is the same as that shown in Fig. 1.

Referring to Fig. 3, the controller shown therein comprises push button switches, a brake coil $B^2$, a brake relay BR and a relay ICR like the corresponding elements of Fig. 1 except for the number of contacts with which the relays are provided. Also in this instance the controller comprises an additional electromagnetic relay 2CR. In view of the fact that the relays similar to those of Fig. 1 differ in respect of contacts a new group of reference characters will be employed for the relay contacts to avoid confusion.

The controller of Fig. 3 provides for inching in a manner similar to that of the controller of Fig. 1 except that the two switches 50 and 51 must be energized to effect completion of the power connections. The inch switch completes circuit from line $L^1$ through the stop push button 12 and normally closed contacts 55 of relay BR, through said switch 10 and the windings of switches T and 51 in parallel to line $L^2$. Switch T in responding provides for short-circuiting of part of the secondary resistance for high torque starting as previously explained, whereas response of switch 51 completes in part the power connections. Also switch 51 in responding engages its contacts 55 to connect across lines $L^1$ and $L^2$ the winding of switch 50, said switch 50 thereupon responding to complete the remainder of the power connections. Further switch 51 in responding engages its contacts 56 to complete a circuit paralleling the contacts 20 of push button switch 10 by the contacts 19 of said switch 10, and switch 51 subject to a time element disengages its contacts 57 to deenergize switch T to reinsert the secondary resistance excluded for high torque starting. Release of the inch push button switch 10 stops the motor by deenergizing switches 50 and 51.

Running is effected by the controller shown in Fig. 3 in a manner generally similar to that of the controller of Fig. 1, but in this instance both switches 50 and 51 must be energized for establishment of power connections as in inching. Depression of the run switch 11 completes a circuit to line $L^1$ for one terminal of the winding of relay ICR, through the contacts 55 of relay BR and stop push button switch 12, whereas the opposite terminal of the winding of relay ICR has a direct connection to line $L^2$. Accordingly operation of the run switch 11 energizes relay ICR which through its contacts 59 parallels the inch push button switch, thereby effecting energization of switches T and 51 as aforedescribed, and energization of switch 51 effects energization of switch 50 as described in connection with inching operation. Also relay ICR through its contacts 60 establishes for itself a maintaining circuit, shunting the run push button switch to provide for continued operation after release of said switch. Assuming the motor secondary circuit to be provided with the control means shown in Fig. 1, release of the run push button switch 11 would render effective the speed regulating means and the running connections would be maintained pending depression of the stop push button switch 12.

When the controller of Fig. 3 functions to establish running connections it also functions to effect circuit commutations preparatory to stopping. Thus relay ICR through its contacts 61 connects across lines $L^1$ and $L^2$ the winding of relay 2CR and through its contacts 62 introduces a gap in the circuit of the winding of relay BR. Relay 2CR being thus connected across lines $L^1$ and $L^2$ responds and through its contacts 63 closes a second gap in the energizing circuit of relay BR. Also relay 2CR through its contacts 64 partially completes a maintaining circuit for itself extending through contacts 65 of series relay SR and shunting the contacts 61 of relay ICR. With the motor connected to lines $L^2$ and $L^3$ one winding of transformer 53 is excited and renders relay SR responsive for completion of the maintaining circuit just described. Furthermore relay 2CR through its contacts 66 completes a maintaining circuit for the winding of switch 50 by shunting the contacts 55 of switch 51.

Thus when stop push button switch 12 is depressed it deenergizes relay ICR and switch 51 to disconnect the motor from line $L^1$, but relay 2CR and switch 50 remain energized, the series relay SR being energized by the partially connected transformer 53. Consequently when relay ICR releases its contacts 62 connect one terminal of the winding of relay BR to line $L^1$ through the contacts 63 of relay 2CR and contacts 65 of the series relay, and as the other terminal of said winding is connected to line $L^2$ relay BR responds. In responding relay BR through its contacts 67 connects across lines $L^1$ and $L^2$ the winding of switch 52, and switch 52 jointly with switch 50 completes the dynamic braking connections for the motor and renders effective both windings of the differential current transformer 53. Also relay BR in responding disengages its contacts 68 to deenergize the brake coil $B^2$ for setting of the mechanical brake. Thus the motor is electrically and mechanically braked for stopping and as the motor approaches zero speed the series relay SR tends to release, the transformer 53 being designed to effect release of the series relay when but only when the motor speed closely approaches zero value. When series relay SR releases it deenergizes relay 2CR which in turn releases switch 50 and relay BR. Relay BR in turn releases switch 52 and again completes the energizing circuit of brake coil B², thus providing both for interruption of dynamic braking connections and release of the mechanical brake.

What I claim as new and desire to secure by Letters Patent is:

1. In combination, an induction motor, a mechanical brake therefor biased to set and having a releasing electromagnet, an alternating current supply circuit to which said electromagnet is normally connected to release said brake, motor connections inclusive of connections from said supply circuit which render said motor self-braking and inclusive of connecting and disconnecting means, means to deenergize said electromagnet to cause said mechanical brake to supplement self-braking of said motor, and motor speed responsive means comprising a differential current transformer with windings connected in different portions of said motor self-braking connections, the last mentioned means operating under the influence of said transformer to terminate self-braking and mechanical braking of said motor automatically when but only when the speed of said motor is reduced to a value closely approaching zero.

2. In combination, an induction motor, a mechanical brake therefor tending to set and having a releasing electromagnet, an alternating current supply circuit to which said electromagnet is normally connected to release said brake, means to establish selectively inching or running connections between said motor and said circuit, said means affording interruption of said connections, means responsive upon interruption by the former means of motor running connections, but not inching connections, to establish for self-braking of said motor connections including connections to said supply circuit, means controlling said releasing electromagnet to deenergize the same concurrently with establishment of said motor self-braking connections, and means comprising a differential current transformer with windings connected in different portions of said motor self-braking connections rendering the last mentioned means sensitive to motor speed variations to effect termination of self-braking of said motor and energization of said brake releasing electromagnet when but only when the speed of said motor is reduced to a value closely approaching zero.

3. In combination, a three phase induction motor, a mechanical brake therefor, a three phase alternating current supply circuit, means to establish dynamic braking connections for said motor comprising individual connections between a first and second terminal of said motor and two lines of said supply circuit and also comprising an interconnection between said second terminal of said motor and a third terminal of said motor, means controlling said mechanical brake for setting thereof concurrently with establishment of said dynamic braking connections and motor speed responsive means comprising a differential current transformer with windings in different portions of the braking connections of said second and third terminals of said motor, the last mentioned means under the influence of said transformer operating to effect through the medium of the first and second mentioned means interruption of said dynamic braking connections and release of said mechanical brake upon decrease in the speed of said motor when but only when the value of the motor speed closely approaches zero.

4. In combination, an induction motor, a mechanical brake therefor, an alternating current supply circuit, a multi-pole switch to establish running connections between said motor and said supply circuit, a second multi-pole switch to establish dynamic braking connections for said motor including connections between said motor and said supply circuit, control means for said switches to effect operation thereof selectively, means to release said mechanical brake for motor operation and to effect setting of said mechanical brake concurrently with establishment of dynamic braking connections by said second switch, and means comprising a differential current transformer with windings subjected to influence by current variations in different portions of said dynamic braking connections to render the last mentioned means sensitive to variations in speed of said motor as a function of change in difference of vector values of the currents resulting from change in motor speed, the last mentioned means effecting interruption of dynamic braking connections by said second switch and effecting through the medium of the second mentioned means release of said mechanical brake when but only when the value of the motor speed closely approaches zero.

5. In combination, a three-phase induction motor, a mechanical brake therefor, an alternating current supply circuit, a two-pole switch, two single pole switches, running connections between said motor and said supply circuit controlled by said two-pole switch and one of said single pole switches, dynamic braking connections for said motor controlled by said two-pole switch and the other of said single pole switches, control means for said switches to effect establishment of running connections and dynamic braking connections selectively, means to release said mechanical brake for motor operation and to effect setting of said mechanical brake concurrently with establishment of said dynamic braking connections, and means comprising a differential current transformer with windings subjected to influence by current variations in different portions of said dynamic braking connections to render the last mentioned means sensitive to variations in speed of said motor as a function of change in difference of vector values of the currents resulting from change in motor speed, the last mentioned means effecting through the medium of the aforementioned means interruption of said dynamic braking connections and release of said mechanical brake when but only when the value of the motor speed closely approaches zero.

6. In combination, an induction motor, a mechanical brake therefor, an alternating current supply circuit, means to establish dynamic braking connections for said motor including connections from said supply circuit, means controlling said mechanical brake to release the same for motor operation and to effect setting thereof upon establishment by the former means of dynamic braking connections, a differential current transformer with windings in different portions of the dynamic braking connections of said motor, and an electromagnetic relay having control connections between the same and said transformer and constituting with said transformer means sensitive to reduction in the motor speed to effect through the medium of the first and second mentioned means interruption of said dynamic braking connections and release of said mechanical brake when but only when the speed of the motor is reduced to a value closely approaching zero.

7. In combination, an induction motor, a mechanical brake therefor, an alternating current supply, circuit connections between said supply circuit and said motor for motor operation, said connections including means for completing and interrupting the same, dynamic braking connections for said motor including connections with said supply circuit and including circuit making and breaking means, means to release said mechanical brake for motor operation and to effect setting thereof concurrently with establishment of said dynamic braking connections, a relay operable to effect automatically through the medium of aforementioned means interruption of said dynamic braking connections and release of said mechanical brake, said relay having a first electromagnet to effect a given setting thereof which is responsive to the first mentioned means when establishing running connections, a second electromagnet for tripping which is energized by the second mentioned means upon establishing dynamic braking connections and a third electromagnet to delay tripping, and a differential current transformer to which said third electromagnet is connected, said transformer having windings connected in different portions of said dynamic braking connections and rendering said third electromagnet effective to delay tripping action until but only until the motor speed is reduced to a value closely approaching zero.

8. In combination, an induction motor, a mechanical brake therefor, an alternating current supply circuit, means to establish selectively inching or running connections between said motor and said supply circuit, said means affording interruption of said connections, means responsive upon interruption by the former means of motor running connections but not inching connections, to establish dynamic braking connections for said motor including connections between said motor and said supply circuit, means to release said mechanical brake and to maintain the same released for running and inching of the motor but effecting setting of said mechanical brake upon establishment of dynamic braking connections, a differential current transformer having windings in different portions of said dynamic braking connections and a relay under the influence of said transformer and constituting therewith means to effect interruption of said dynamic braking connections and release of said mechanical brake, said relay having a first electromagnet for setting thereof which is responsive to the first mentioned means when establishing running connections but not when establishing inching connections, a second electromagnet for tripping which is energized by the second mentioned means upon establishing dynamic braking connections and a third electromagnet to delay tripping, said third electromagnet being supplied with current from said transformer and under the influence of said transformer delaying tripping of said relay until but only until the motor speed is reduced to a value closely approaching zero.

9. In combination, an induction motor, a mechanical brake therefor, an alternating current supply circuit, means to connect said motor to said supply circuit for inching or running selectively and to interrupt said connections, means under the control of the former means to establish upon interruption of running connections but not upon interruption of inching connections dynamic braking connections for said motor including connections between said motor and said supply circuit, means to release said mechanical brake for running and inching of the motor and to set said mechanical brake concurrently with establishment of dynamic braking connections, a differential current transformer having windings connected in different portions of said dynamic braking connections to be sensitive to variations in speed of said motor, and a relay having an operating winding supplied by said transformer for response of said relay subject to release when but only when the motor speed is reduced to a value closely approaching zero, said relay when so released effecting interruption of said dynamic braking connections and release of said mechanical brake.

CYRIL P. FELDHAUSEN.

REFERENCES CITED

The following references are of record in the file of this patent:

UNITED STATES PATENTS

| Number | Name | Date |
|---|---|---|
| 729,640 | McCurdy | June 2, 1903 |
| 1,113,593 | Wright | Oct. 13, 1914 |
| 2,409,264 | Feldhausen | Oct. 15, 1946 |